(12) United States Patent
Gabor et al.

(10) Patent No.: US 10,976,961 B2
(45) Date of Patent: Apr. 13, 2021

(54) DEVICE, SYSTEM AND METHOD TO DETECT AN UNINITIALIZED MEMORY READ

(71) Applicant: Intel Corporation, Santa Clara, CA (US)

(72) Inventors: Ron Gabor, Herzliya (IL); Tomer Stark, Tirat Carmel (IL); Joseph Nuzman, Haifa (IL); Ady Tal, Zichron Yaacove (IL)

(73) Assignee: Intel Corporation, Santa Clara, CA (US)

( * ) Notice: Subject to any disclaimer, the term of this patent is extended or adjusted under 35 U.S.C. 154(b) by 36 days.

(21) Appl. No.: 16/228,374

(22) Filed: Dec. 20, 2018

(65) Prior Publication Data

US 2020/0201567 A1    Jun. 25, 2020

(51) Int. Cl.
*G06F 9/34* (2018.01)
*G06F 3/06* (2006.01)
(Continued)

(52) U.S. Cl.
CPC .......... *G06F 3/0659* (2013.01); *G06F 3/0604* (2013.01); *G06F 3/0673* (2013.01); *G06F 9/3824* (2013.01); *G06F 11/0721* (2013.01)

(58) Field of Classification Search
CPC ............... G06F 9/30043; G06F 9/3824; G06F 11/0721; G06F 11/1435; G06F 11/3086; G06F 11/366; G06F 11/3636; G06F 2212/466; G06F 3/0659; G06F 3/0604; G06F 3/0673; G06F 11/073; G06F 11/0751; G06F 11/00; G06F 11/10; G06F 12/00;
(Continued)

(56) References Cited

U.S. PATENT DOCUMENTS

| 8,990,670 | B2 * | 3/2015 | Ozdemir | G06F 11/1048 |
| | | | | 714/810 |
| 2013/0251025 | A1 * | 9/2013 | Smith | H04N 19/93 |
| | | | | 375/240.02 |

(Continued)

OTHER PUBLICATIONS

Extended European Search Report from European Patent Application No. 19203464.3 dated Feb. 7, 2020, 9 pgs.

*Primary Examiner* — Daniel H Pan
(74) *Attorney, Agent, or Firm* — Green, Howard & Mughal LLP

(57) ABSTRACT

Techniques and mechanisms for circuitry of a processor to automatically provide, and perform an operation based on, metadata indicating an uninitialized memory block. In an embodiment, processor circuitry detects a software instruction which specifies a first operation to be performed based on some data at a memory block. Metadata corresponding to said data comprises an identifier of whether the data is based on an uninitialized memory condition. Processing of the instruction, includes the processor circuitry automatically performing a second operation based on the identifier. The second operation is performed independent of any instruction of the application which specifies the second operation. In another embodiment, execution of the instruction (if any) is conditional upon an evaluation which is based on the state identifier, or the second operation is automatically performed based on an execution of the first instruction.

22 Claims, 12 Drawing Sheets

(51) Int. Cl.
*G06F 11/07* (2006.01)
*G06F 9/38* (2018.01)

(58) Field of Classification Search
CPC .. G06F 9/030043; G06F 9/3834; G11B 20/18
USPC .................. 712/220, 227; 714/38.11, 54
See application file for complete search history.

(56) References Cited

U.S. PATENT DOCUMENTS

| | | | |
|---|---|---|---|
| 2014/0156880 A1* | 6/2014 | Shim | G06F 3/061 |
| | | | 710/22 |
| 2016/0283300 A1* | 9/2016 | Stark | G06F 11/1064 |
| 2016/0292032 A1 | 10/2016 | Von Gemuenden | |
| 2017/0075817 A1* | 3/2017 | Gove | G06F 12/1027 |

* cited by examiner

```
                                                            ┌─ 600
┌─────────────────────────────────────────────────────────┐
│ if (pointer[X+4:X] != memory_mcd_color[4:0])            │
│ goto real_mcd_fault // Generate a fault where the 5-bit │
│ // data color is incorrect else, otherwise...           │
│ memory_mcd_color[5] = 0 // Unset the Uninitialized bit  │
│ resume_application()                                    │
└─────────────────────────────────────────────────────────┘

┌─ 601
┌─────────────────────────────────────────────────────────┐
│                                                         │
│ store table[table_offset(p)].uninitialized, 0           │
│ store [p], data                                         │
│                                                         │
└─────────────────────────────────────────────────────────┘

┌─ 602
┌─────────────────────────────────────────────────────────┐
│                                                         │
│ if (table[table_offset(p)].uninitialized != 0) fault()  │
│ load r1, [p]                                            │
│                                                         │
└─────────────────────────────────────────────────────────┘
```

```
ld  r1, [p]
(r1' <- table[table_offset(p)].uninitialized)
// Load the state identifier to bit r1'
```

611

```
st [p], r1
(table[table_offset(p)].uninitialized <- r1')
// Store r1 initialized state to memory
// If r1 is constant then it's initialized
```

612

```
mov r1, r2
(r1' <- r2')
// If r2 is uninit then r1 will be uninit
```

613

```
add r1, r2
(r1' <- r1' | r2')
// If either r1 or r2 are uninit, r1 will be uninit
```

614

```
cmp r1, r2
(Flags.Uninit = r1' | r2')
// If either r1 or r2 are uninit,
// the result is uninitialized
```

FIG. 6B

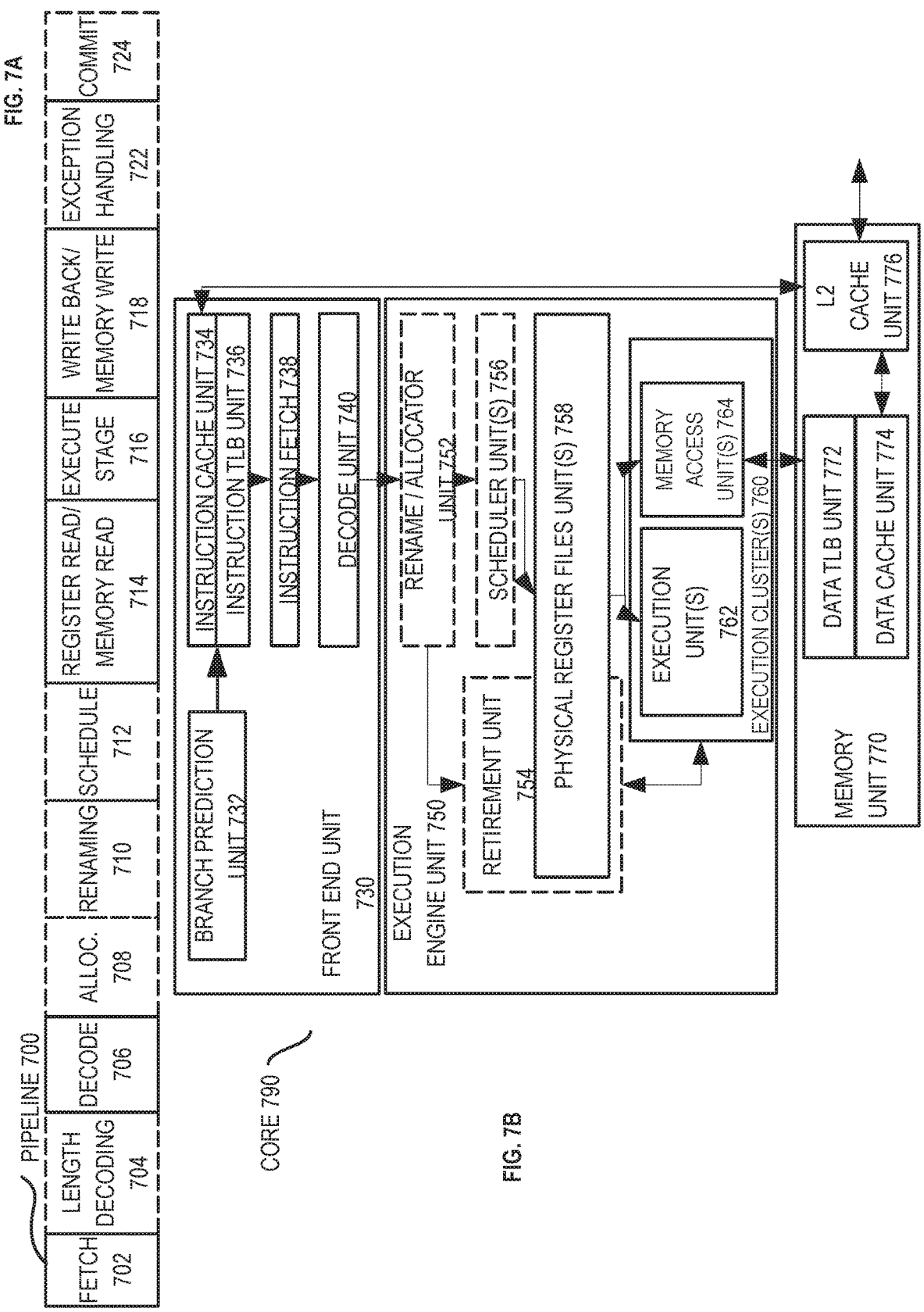

DEVICE, SYSTEM AND METHOD TO DETECT AN UNINITIALIZED MEMORY READ

BACKGROUND

1. Technical Field

Embodiments of the invention relate generally to processor operations and more particularly, but not exclusively, to providing information indicating whether data is based on an uninitialized memory state.

2. Background Art

Memory initialization refers generally to a process which brings a given memory resource into some deterministic state of data storage. A memory resource is said to be uninitialized when that memory resource stores data which is potentially corrupted, out-of-date, random and/or otherwise useless in a way that does not lend itself to resolution by error detection/correction. In a typical situation, an uninitialized state of a memory resource is caused when a software program requests a new memory buffer, e.g. by invoking the memory allocation function malloc( ). The program receives a pointer to a location in memory, and is thereby able to read from and/or write to said location. However, the memory location contains unknown legacy data upon allocation. By contrast, a calloc( ) function, supported by some architectures, clears such a memory location of legacy data before it is made available to a program.

An "uninitialized memory read" (UMR) typically occurs when data is read from some memory resource at a time when the memory source is uninitialized. Accordingly, UMRs pose a risk of a software operation being performed mistakenly or incorrectly based on data which has no relevance to the intended utilization thereof. UMR-based errors are a common bug in C/C++ and other software languages which implement dynamic memory accesses. Such UMR-based errors typically cause unpredictable program behavior, create data corruption, or cause security vulnerabilities which can be exploited to mount attacks. Therefore, there is an increasing demand being placed on incremental improvements to the prevention of software operations which are based on uninitialized memory reads.

BRIEF DESCRIPTION OF THE DRAWINGS

The various embodiments of the present invention are illustrated by way of example, and not by way of limitation, in the figures of the accompanying drawings and in which:

FIGS. 6A, 6B illustrate various examples of pseudocode each representing a respective operation which is implicitly performed based on metadata according to a corresponding embodiment.

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention.

DETAILED DESCRIPTION

Figure 1:
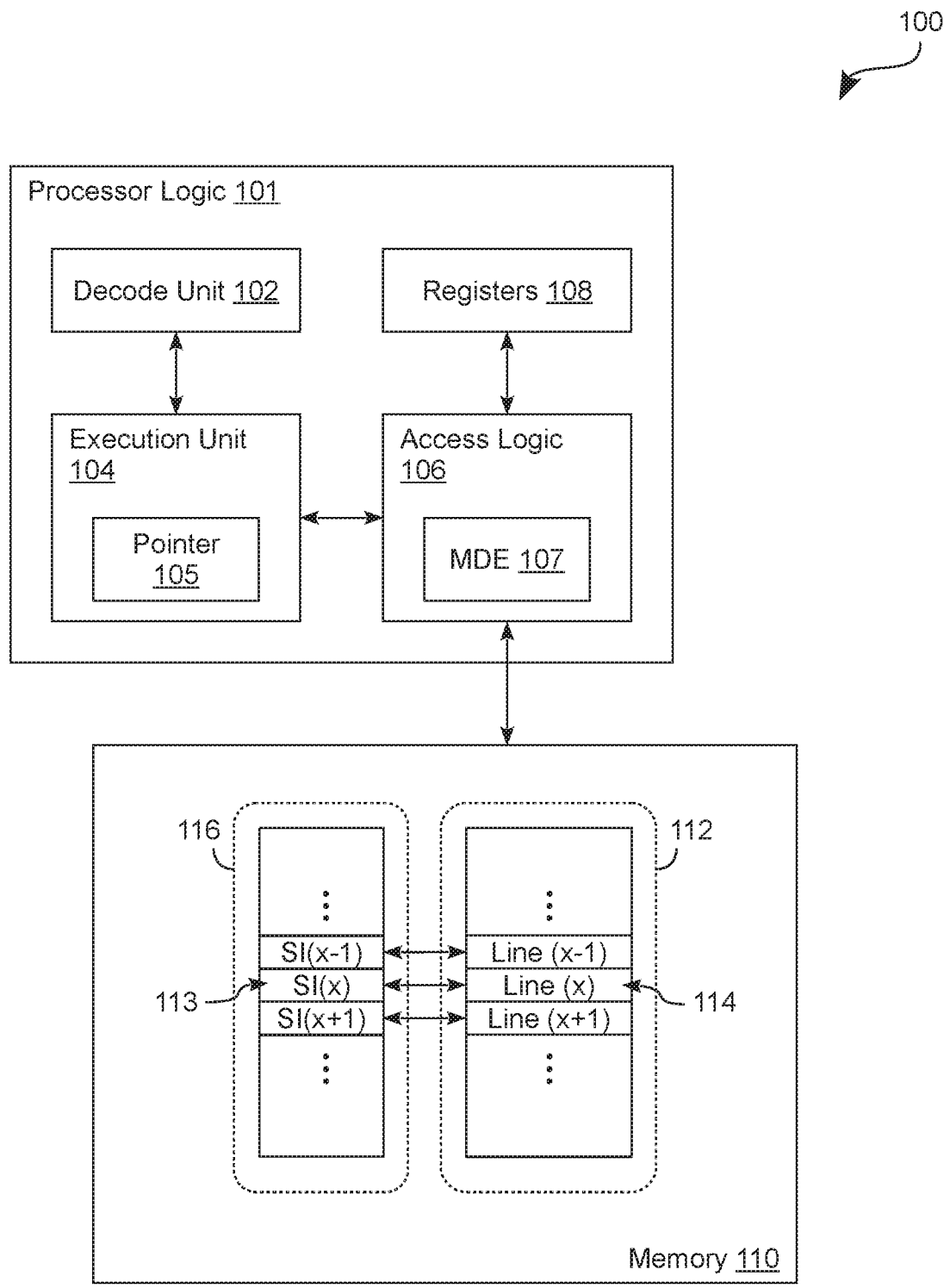
FIG. 1 is a functional block diagram illustrating elements of a system to determine a state of data at a memory resource according to an embodiment.

Embodiments described herein variously provide techniques and/or mechanisms to detect an uninitialized memory state automatically—e.g., independent of any software instruction(s) which are to explicitly command such detection. In an embodiment, circuitry of a processor provides functionality to process an instruction of a software application, the instruction specifying an operation which is to be performed based on some data which includes, or is based on, data retrieved from a given memory block. In an embodiment, metadata corresponding to such data comprises a variable which, at a given time, specifies whether the data in question is based the condition of some memory block being uninitialized. Such a variable is referred to herein as a "memory state identifier" (or, for brevity, "state identifier").

Data is "based on an uninitialized memory condition" where, for example, a memory block is uninitialized at a time when said data is stored by (and, for example, retrieved from) said memory block. Alternatively, data is based on an uninitialized memory condition where, for example, the data is calculated or otherwise generated based on other data which, itself, is based on some uninitialized memory condition. For example, some embodiments provide for an uninitialized state of a first memory block to be inherited by a second memory block (e.g., notwithstanding an earlier initialization of said second memory block), based a write of data to the second memory block, where the data is generated based on other data at the uninitialized first memory block.

As used herein with reference to functionality of a processor, "processing an instruction" comprises some or all of retrieving data based on the instruction, retrieving metadata corresponding to such data, and evaluating the corresponding metadata (e.g., to detect whether the data is based on an uninitialized memory condition and, in some embodiments, to detect whether the correct data has been retrieved). In some embodiments, processing of a software instruction includes (or is otherwise based on) a communication, to or from a memory, of both some indicated data and metadata corresponding thereto, where said communication is based on a pointer to a memory block which stores, or is to store, the data indicated.

In some scenarios, processing an instruction comprises executing the instruction to perform the specified operation based on the indicated data. For example, any such execution of the instruction is performed conditionally, in some embodiments—e.g., where the execution is subject to an evaluation as to whether (per the corresponding state identifier) the data is based on an uninitialized memory condition. Alternatively or in addition, such execution of an instruction—in some scenarios—automatically results in the further performance of an additional operation which is based on the corresponding metadata (e.g., based on the corresponding state identifier). Such an additional operation is performed implicitly as part of the processing of the software instruction in question, wherein the instruction does not specify any such performance (and where, for example, the software application is unaware of such performance).

Some embodiments variously provide UMR detection functionality with hardware circuitry that operates with (e.g., is coupled to), or is integrated with, instruction execution logic of a processor. Such UMR detection functionality is automatic at least insofar as an evaluation of a state identifier takes place independent of any software instruction which specifies that the evaluation is to be performed. Accordingly, some embodiments free software from having to access and evaluate at least some metadata for the purpose of supporting UMR detection. By contrast, conventional technologies variously rely on explicit software mechanisms to generate, manage and evaluate information for use in detecting UMRs. These conventional mechanisms typically have very high software execution overhead, and are thus often limited to use only in debug operations.

Certain features of various embodiments are described herein with reference to an automatic UMR detection functionality which is provided as an extension of a type of data verification, commonly referred to as memory corruption detection (also known as data corruption detection, or "DCD"). Memory corruption detection, or "MCD", refers generally to any of various techniques which use "memory tagging," wherein a given memory block is assigned a metadata value (or "color") which is available to be subsequently used as a reference for detecting whether—for example—memory resources have been corrupted or, alternatively, whether data has been retrieved from the wrong memory block.

In conventional MCD solutions, software typically colors a memory block with a MCD metadata value upon an allocation of said memory block (e.g., the allocation by one of an alloc function, a malloc function, or other suitable library function). In an example implementation, a software-managed table (e.g., a flat table or a multi-level table) or other suitable data structure is used to store MCD metadata values variously corresponding each to a respective memory block. The MCD color value for a given memory block (or object) is also stored with pointer information—e.g., with reserved bits of a linear address of a pointer to a location of the memory block. Based on an access to the given memory block, hardware compares the MCD metadata value in the pointer information to a MCD metadata value retrieved from a memory block (or a memory location corresponding to the memory block). A fault is generated where, for example, the MCD metadata values do not match.

In some embodiments, processor logic which is operable to retrieve and evaluate MCD color information from a memory—e.g., according to conventional MCD techniques—is adapted to also automatically retrieve and evaluate one or more metadata bits which represent a state identifier. Such embodiments variously provide an efficient UMR detection solution with little or no overhead with respect to the execution of software instructions.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

It is pointed out that those elements of the figures having the same reference numbers (or names) as the elements of any other figure can operate or function in any manner similar to that described, but are not limited to such. In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor which supports UMR detection functionality.

FIG. 1 shows features of a system 100, according to an embodiment, to determine whether a memory resource has been initialized. System 100 is one example of an embodiment wherein circuitry of a processor is operable to access and evaluate metadata which specifies whether data, indicated by an instruction of a software application, is based on an uninitialized memory condition. In various embodiments, such circuitry performs the metadata evaluation automatically—e.g., independent of one or more instructions of the software application, if any, which specify that the evaluation is to be performed.

As shown in FIG. 1, system 100 includes processor logic 101 comprising a hardware decode unit 102 to decode an instruction, e.g., an instruction that is to request access to a block of a memory 110 through a pointer 105 to the block of the memory 110. Pointer 105 may be an operand of the instruction. Depicted hardware execution unit 104 is to execute a decoded instruction which, for example, is to request access to the block of the memory 110 through a pointer 105—e.g., having a value of the (linear, for example) address 114—to the block of the memory 110. In some embodiments, a block of data is a single line of data, such as the illustrative Line(x) shown. In other embodiments, a block of data is multiple lines of data. For example, a block of memory may be lines 1 and 2 of data of the (e.g., linear or physical) addressable memory 112 of memory 110 that includes a pointer 105 (e.g., having a value of the address 114) to one (e.g., the first) line (e.g., line 1). Certain embodiments may have a memory of a total size of X number of lines.

In some embodiments, processor logic 101 further includes one or more registers—such as the illustrative registers 108 shown—to variously store variables (or other such data), configuration state information and/or the like. For example, in some embodiments, some or all of registers 108 are to temporarily store data retrieved from a memory 110 and/or one or more values which have been calculated or otherwise generated based on such data. Additionally or alternatively, some or all of registers 108 are control register or configuration registers, such as, but not limited to, model specific register (MSR) or other registers. In one embodiment, a value stored in a control register is to change (e.g., control) selectable features, for example, features of the hardware processor.

Processor logic 101 includes a coupling (e.g., connection) to memory 110. Memory 110 may be a memory (e.g., system memory) which is local to a hardware processor that comprises processor logic 101. Alternatively, memory 110 may be a memory separate from the hardware processor, for example, a memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain embodiments herein.

Processor logic 101 includes access logic 106 (comprising a memory management unit, for example) to perform and/or control access (e.g., by the execution unit 104) to the (e.g., addressable memory 112 of) memory 110. In one embodiment, a hardware processor includes a connection to the memory. Additionally or alternatively, access logic 106 may include a connection to the (e.g., addressable memory 112 and/or metadata 116 of) memory 110.

To facilitate UMR detection, memory 110 comprises metadata 116, values of which variously correspond each to a respective memory block of addressable memory 112. For a given memory block of addressable memory 112, metadata 116 comprises a corresponding memory state identifier variable which, at a given time, specifies whether data stored at the memory block is based on a condition which is referred to herein as an "uninitialized memory condition." Data is based on an uninitialized memory condition where, for example, a memory block is uninitialized at a time when said data is stored by that memory block, or (alternatively) where said data has been calculated or otherwise determined on some other data which is, or was, stored at some other memory block while that other memory block was uninitialized.

In the example embodiment shown, metadata 116 includes a state identifier SI(x) 113 which corresponds to the memory block Line(x) at address 114—e.g., where SI(x) 113 specifies whether data at memory block Line(x) is based on an uninitialized memory condition. For example, SI(x) 113 can be set to either of a first Boolean value or a second Boolean value—e.g., "1" or "0"—to indicate, respectively, a first state ("uninitialized") wherein data of Line(x) is based on an uninitialized memory condition, or a second state ("initialized") wherein data of Line(x) is independent of such an uninitialized memory condition. Metadata 116 further comprises, for example, state identifier SI(x−1) which similarly specifies whether data at a memory block Line(x−1) is based on an uninitialized memory condition, and another state identifier SI(x+1) which specifies whether data at a memory block Line(x+1) is based on an uninitialized memory condition. Metadata 116 includes more, fewer or different state identifiers, in various other embodiments.

Metadata 116 is maintained, for example, as a table (or other suitable data structure) which is distinct from addressable memory 112. In such an embodiment, an access to a memory block of addressable memory 112 results in, or is otherwise a basis for, an automatic access to a corresponding state identifier of metadata 116. In alternative embodiments, metadata 116 is variously incorporated in addressable memory 112—e.g., where SI(x) 113 comprises one or more dedicated bits of Line (x), where SI(x−1) comprises one or more dedicated bits of Line (x−1), where SI(x+1) comprises one or more dedicated bits of Line (x+1), and/or the like.

In an embodiment, software sets the value of a state identifier to indicate an uninitialized state of the corresponding memory block—where such a value is set as part of, or otherwise based on, an allocation of the corresponding memory block (e.g., the allocation by one of an alloc function, a malloc function, or other suitable library function).

To facilitate automatic UMR detection functionality at processor logic 101, circuitry which processes a software instruction—e.g., including circuitry of access logic 106 and/or circuitry of execution unit 104—automatically retrieves, evaluates and/or updates state identifier information of metadata 116. For example, access logic 106 includes, or is coupled to, metadata evaluator circuitry MDE 107 which evaluates state identifiers to variously detect for UMR events. In one such embodiment, execution of a software instruction with execution unit 104 is conditioned upon such an evaluation by MDE 107. In another embodiment, such evaluation of a state identifier is performed automatically as part of, or otherwise based on, the execution of an instruction by execution unit 104 (e.g., wherein execution unit 104 comprises MDE 107).

In response to a write (if any) to a memory block which is uninitialized, some embodiments automatically update the corresponding state identifier to indicate an initialized state of said memory block. By contrast, in response to an attempt (if any) to read from such a memory block, some embodiments automatically access and evaluate the corresponding state identifier to determine whether the data currently at the memory block is based on an uninitialized memory condition. A fault is generated where, for example, such a state identifier indicates an uninitialized state. In some embodiments, a state identifier is subject to being changed from indicating an initialized state to an uninitialized state—e.g., where a write to the corresponding (previously initialized) memory block stores data which is based on the uninitialized state of some other memory block.

In some embodiments, metadata 116 further comprises MCD color values (not shown) which each correspond to a respective memory block of addressable memory 112. Such a MCD color value may be evaluated, in addition to or in combination with a state identifier, to detect whether the data in question is correct—e.g., to detect that the memory has not been corrupted and that the intended data was retrieved. In various embodiments, the automatic retrieval and evaluation of state identifier information (to detect a UMR) is performed with circuitry which is adapted from conventional mechanisms and/or techniques for retrieving and evaluating a MCD color value.

Figure 2:
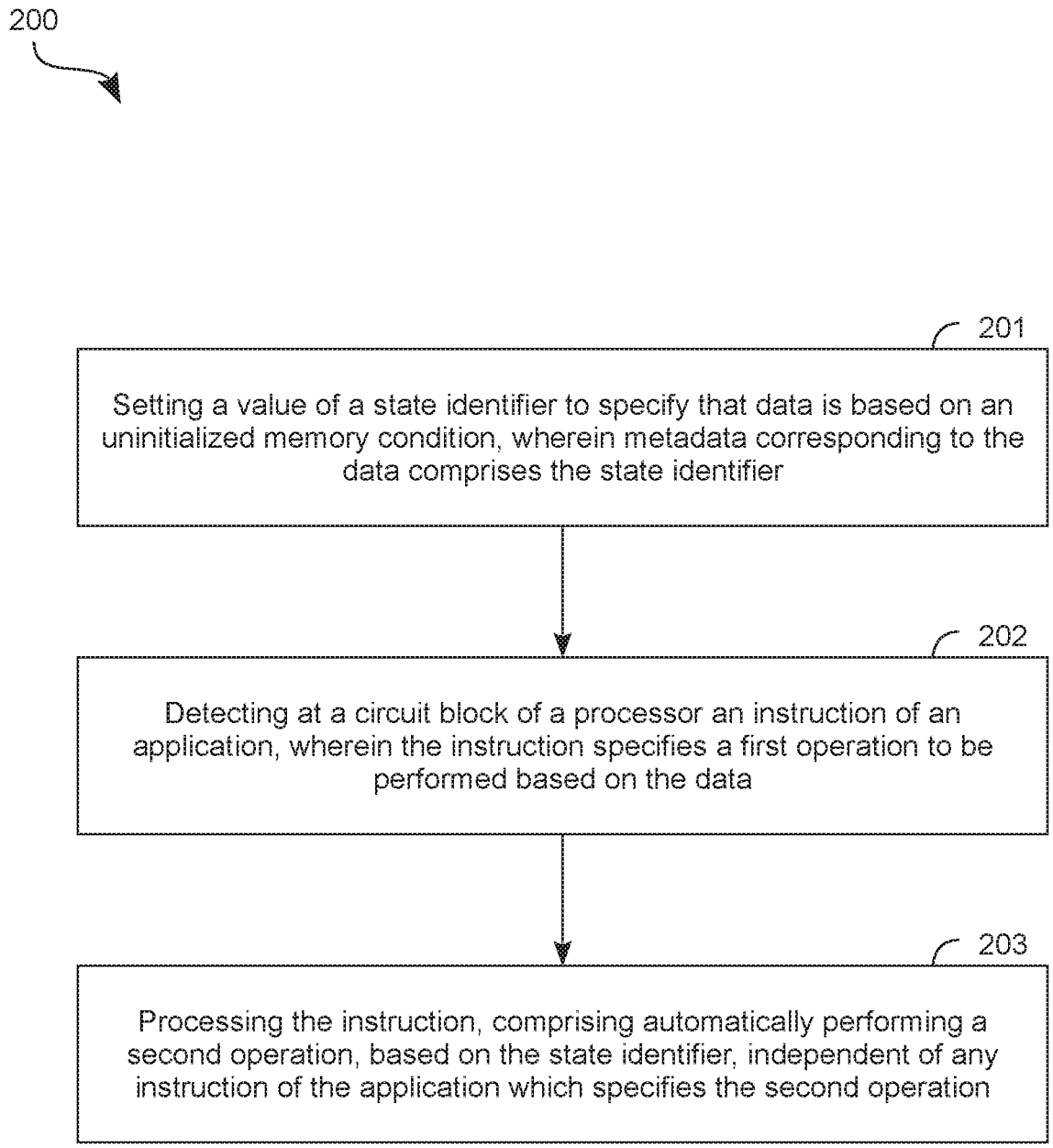
FIG. 2 is a flow diagram illustrating elements of a method to communicate memory state information according to an embodiment.

FIG. 2 shows features of a method 200, according to an embodiment, to determine whether data is based on an uninitialized memory condition, where the data is indicated by an instruction of an application. Method 200 is one example of an embodiment wherein the processing of an instruction comprises hardware logic automatically performing an operation based on a state identifier which is associated with data indicated by said instruction (the state identifier specifying whether said data is based on an uninitialized memory condition). Method 200 may be performed with some or all of system 100, for example.

As shown in FIG. 2, method 200 includes (at 201) setting a value of a state identifier to specify that some data is based on an uninitialized memory condition. The setting at 201 may include, or be performed in response to, an allocation of a memory block which stores the data. In an example embodiment, the setting at 201 includes SI(x) 113 of metadata 116 being updated by software based on an allocation of Line(x) at address 114 of addressable memory 112. In other embodiments, method 200 is based on (e.g., is performed subsequent to)—but omits—the setting at 201.

Method 200 further comprises (at 202) detecting an instruction of an application, wherein the instruction specifies a first operation to be performed based on the data. Referring now to the example embodiment of system 100, the detecting at 202 is performed, for example, with decode unit 102 or other circuitry (e.g., at execution unit 104 or access logic 106) which is to facilitate processing of the instruction. In an embodiment, such detecting includes determining that the data (and/or corresponding metadata) needs to be accessed to execute the instruction or, for example, to perform an evaluation for determining whether any such execution is to take place. The detecting at 202 takes place, for example, while the state identifier still indicates that the data is based on an uninitialized memory condition. Alternatively, such detecting may take place after a data write or other operation (not shown) which results in the state identifier being automatically updated to indicate that data of the memory block is independent of such an uninitialized memory condition.

At some point in time, a communication of both the data and corresponding metadata (including the state identifier) is based on a pointer to a memory block which is to store the data. For example, a load, store or other instruction or the like includes or otherwise indicates such a pointer, which (in some embodiments) results in memory management circuitry, or other such access logic, automatically communicating the metadata—in association with a communication of the corresponding data—to or from a memory.

Method 200 further comprises (at 203) processing the instruction which is detected at 202, where such processing comprises automatically performing a second operation based on the state identifier. The second operation is performed independent of any instruction of the application which specifies the second operation. In an embodiment, any execution of the instruction which might be performed by the processing at 203 is conditional upon an evaluation which is based on the state identifier. For example, the second operation (performed by MDE 107, in some embodiments) evaluates, based on the state identifier, whether the corresponding data is based on an uninitialized memory condition. In such an embodiment, execution of the instruction (e.g., by execution unit 104) is selectively prevented, or authorized, based on a result of the evaluation. Alternatively, the second operation is automatically performed by the processing at 203 based on an execution of the first instruction. For example, the second operation, in some embodiments, automatically, loads, stores, updates, or otherwise accesses the state identifier—e.g., based on an operation type of the first operation which is to be performed based on the data.

In some embodiments, method 200 is performed with a processor which includes instruction execution circuitry and evaluator circuitry coupled thereto (e.g., execution unit 104 and MDE 107, respectively). In one such embodiment, the state identifier comprises at least one bit, wherein the metadata further comprises "data color" bits—e.g., bits representing a MCD color value assigned to the data. For example, the processing at 203 by one such processor comprises the evaluator circuitry evaluating both the data color bits and the at least one state identifier bit—e.g., wherein the evaluator circuitry compares a single metadata value (including both the data color bits and the at least one state identifier bit) to a corresponding fiducial value. In response to such an evaluation indicating both an initialized memory state and a correct data color value, the evaluator circuitry signals the execution circuitry to enable or otherwise authorize an execution of the instruction. By contrast, in response to such an evaluation indicating either of an uninitialized memory state or an incorrect data color value, the evaluator circuitry signals the execution circuitry to disable or otherwise forego an execution of the instruction.

In another embodiment, the evaluator circuitry of such a processor evaluates the data color bits but not the one or more state identifier bits. Execution of the instruction by the execution circuitry is in response to (e.g., conditional upon) a result of such an evaluation, in some embodiments. For example, the evaluator circuitry may compare a single metadata value (including only the data color bits) to a corresponding fiducial value. In response to such an evaluation indicating an incorrect data color value, the evaluator circuitry signals the execution circuitry to forego an execution of the instruction—e.g., regardless of what the state identifier might indicate regarding any uninitialized memory condition.

By contrast, in response to such an evaluation indicating a correct data color value, the evaluator circuitry instead signals the execution circuitry to authorize an execution of the instruction. In some embodiments, the execution circuitry, responsive to such authorization, performs the execution conditional upon an automatic evaluation of the at least one state identifier bit by the execution circuitry. Alternatively, execution of the instruction may include or otherwise provide a basis for an automatic performance of the second operation.

In an embodiment, the first operation is to load the data to a register, wherein the second operation is to load the state identifier to a metadata table entry (or other suitable repository) corresponding to the register. In another embodiment, the first operation is to store the data to the memory block, wherein the second operation is to store to, a metadata table entry (or other suitable repository) corresponding to the memory block, a state identifier value which indicates that the data is independent of an uninitialized memory condition. In still another embodiment, the first operation is to move the data from a first register to a second register, wherein the second operation is to move the state identifier from the first register to the second register. In still another embodiment, the first operation is to perform a calculation based on both the data and other data, wherein the second operation is to provide a value of another state identifier corresponding to a result of the calculation, wherein the value of the other state identifier is based on the state identifier. In still another embodiment, the first operation is to determine, based on the data, whether the application is to jump to an execution of another instruction, and wherein the second operation is to determine, based on the state identifier, whether the first operation is to be performed (or whether, for example, a fault is to be generated instead).

Figure 3:
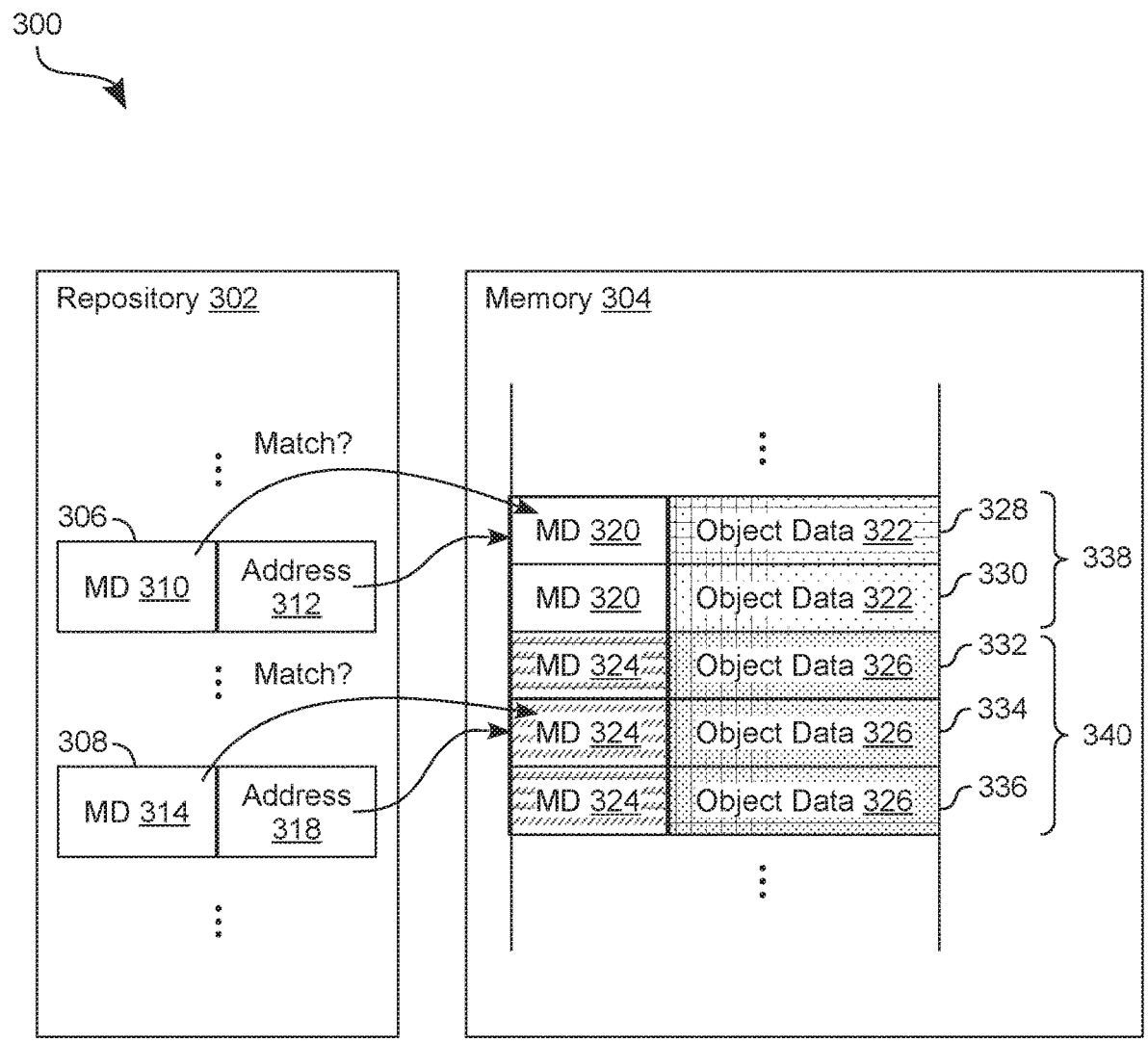
FIG. 3 is a functional block diagram illustrating elements of a system to detect an uninitialized memory read according to an embodiment.

FIG. 3 shows features of a system 300 to identify a state of data stored at a memory according to an embodiment. System 300 is one example of an embodiment wherein a pointer is used to access both data stored at a memory block and metadata corresponding to said data. The metadata includes a state identifier (which specifies whether the data is based on an uninitialized memory condition) and—in some embodiments—a data color value assigned to the data. Such a data color value is used to support MCD functionality. In some embodiments, system 300 includes some or all of the features of system 100 and/or is used to perform method 200, for example.

As shown in FIG. 3, system 300 includes a memory 304 and a repository 302 for pointers to be used for accessing memory 304. A given pointer in repository 302 can include, for example, one or more fields for metadata (MD) and a memory address field. By way of illustration only, pointer 306 includes metadata MD 310 and a memory address 312, where pointer 308 includes metadata MD 314 and a memory address 318. The MDs 310 and 314 are stored in one or more bits (such as upper bits, which may not be part of a linear address) of the pointers 306 and 308, respectively. The memory addresses 312 and 318 reference beginning address locations of memory objects 338 and 340 in the memory 304. For example, memory address 312 references an address location to contiguous memory block 328 and memory address 318 references an address location to contiguous memory block 332. The memory objects 338 and 340 include one or more contiguous memory blocks. For example, memory object 338 include contiguous memory blocks 328 and 330 and memory object 340 include contiguous memory blocks 332, 334, and 336. When, for example, a portion of the memory 304 is allocated to newly created memory objects 338 and 340 for memory object data 322 and 326, a memory allocation routine (e.g., by a calloc routine, a malloc routine, or a realloc routine) is adapted to automatically generate metadata MDs 320 and 324 to be associated with the contiguous memory blocks 328-330 and 332-336, respectively.

Upon allocation of contiguous memory blocks 328-330, MD 320 initially indicates that data of contiguous memory blocks 328-330 is based on an uninitialized memory condition. For example, MD 320 may include a single state identifier value which specifies whether any of contiguous memory blocks 328-330 includes such data. In another embodiment, MD 320 includes multiple state identifiers, each indicating a specific (un)initialized state for a different respective one of contiguous memory blocks 328-330. Similarly, upon allocation of contiguous memory blocks 332-336, MD 324 initially indicates that data of contiguous memory blocks 332-336 is based on an uninitialized memory condition. For example, MD 324 may include a single state identifier value which specifies whether any of contiguous memory blocks 332-336 includes such data. In another embodiment, MD 324 includes multiple state identifiers, each indicating a specific (un)initialized state for a different respective one of contiguous memory blocks 332-336. In some embodiments, MD 320 further comprises a first MCD color value which is assigned to contiguous memory blocks 328-330 upon allocation thereof. Similarly, MD 324 may further comprise a second MCD color value which is assigned to contiguous memory blocks 332-336 upon allocation thereof.

During operation of system 300, a memory access instruction from an application may (for example) request object data of a contiguous memory block. For example, system 300 may receive a memory access instruction, where the memory access instruction includes the pointer 306 with a memory address 312 indicating a beginning location of the object data 322 at contiguous memory block 328. When processing the memory access instruction, evaluation logic (such as MDE 107) detects, based on a corresponding state identifier of MD 320, whether object data 322 is based on an uninitialized memory condition. Where an uninitialized memory condition is detected, a fault may be generated with the evaluation logic—e.g., where such fault generation is conditional upon an instruction type of the memory access instruction.

In some embodiments, such evaluation logic further performs MCD operations—e.g., by comparing the metadata MD 310 of the pointer 306 with the metadata MD 320 associated with the contiguous memory block 328. Where it is determined that MD 310 matches MD 320, system 300 communicates the object data 322 to the requesting application. The system 300 iterates through the contiguous memory blocks 328 and 330 of memory object 338 until the system 300 reaches the contiguous memory block 332. The system 300 may determine, for example, that it has reached the end of the contiguous memory blocks 328 and 330 when the metadata MD 324 does not match the metadata MD 310. When the metadata MD 324 does not match the metadata MD 310, the system 300 may generate a fault message (such as an exception) indicating that the end-of-memory object 338 has been reached.

Figure 4A:
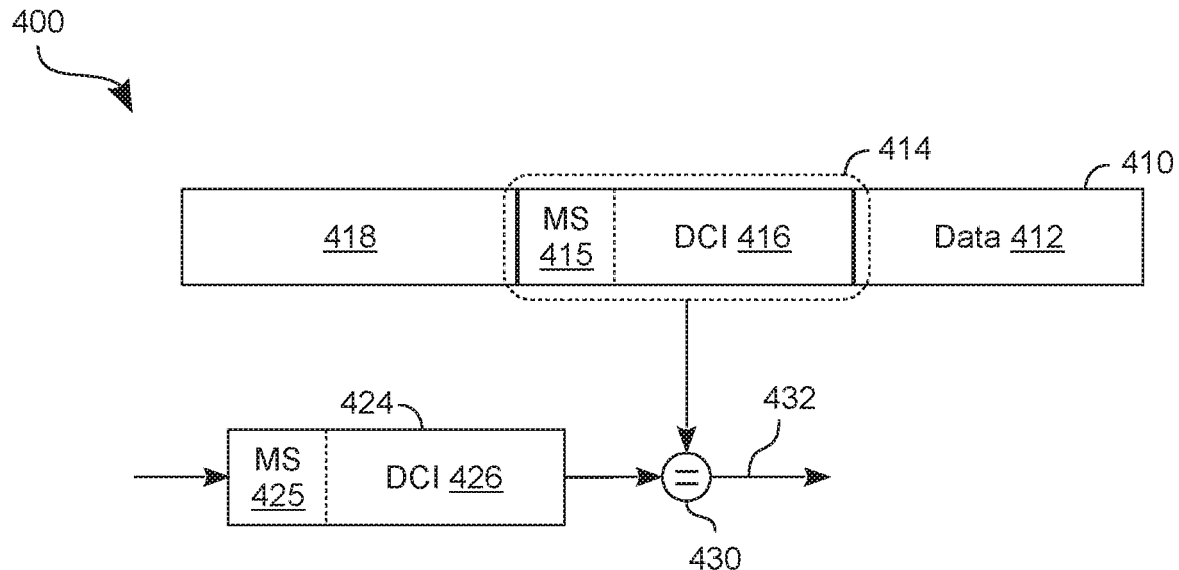
FIGS. 4A, 4B are hybrid diagrams each illustrating elements of respective processing to detect an uninitialized memory read according to a corresponding embodiment.

FIG. 4A shows features of processing 400 to evaluate memory state information according to an embodiment. Processing 400 may, for example, be performed with one of systems 100, 300—e.g., where method 200 includes some or all of processing 400.

In the example embodiment of processing 400, a memory access instruction from an application requests object data of a memory block (e.g., from one of contiguous memory blocks 328-336). The memory access instruction includes, or otherwise results in the use of, a pointer which references an address to the memory block. A communication 410 in response to the memory access instruction comprises object data 412 and metadata 414 for object data 412. Metadata 414 comprises one or more bits MS 415 representing a state identifier which indicates whether object data 412 is based on an uninitialized memory condition. In some embodiments, metadata 414 further comprises data color indicator bits DCI 416 representing a MCD value which is assigned to the memory block. In some embodiments, communication 410 further includes additional metadata bits (such as the illustrative bits 418 shown).

The metadata 414 comprising MS 415 and DCI 416 is not necessarily accessed at the same memory block from which data 412 is retrieved. In various embodiments, metadata 414 is retrieved from a metadata table (or other such structure) which is distinct from memory blocks—in the same memory resource or, alternatively, in a different memory resource—which are allocated to store data such as data 412. Retrieval of metadata 414 is based on a pointer to the memory block storing data 414, wherein such metadata retrieval is performed automatically based on a request to retrieve data 414.

In an embodiment, the pointer referencing the memory block storing data 412 comprises (or is otherwise associated with) a fiducial value 424 which is to be used as a basis for evaluating a state of the memory block. Fiducial value 424 comprises, for example, one or more bits MS 425 corresponding to one or more bits MS 415, and bits DCI 426 corresponding to data color indicator bits DCI 416. In one such embodiment, processing of the memory access instruction comprises a comparison circuit 430 (e.g., of MDE 107) determining whether the value of metadata 414 matches fiducial value 424. Where the comparison indicates both an initialized memory condition—i.e., that object data 412 is independent of any uninitialized memory condition—and a correct MCD value of DCI 416, comparison circuit 430 generates a signal 432 to enable execution of the memory access instruction. By contrast, signal 432 is to instead disable or otherwise prevent execution of the memory access instruction where, for example, the comparison indicates either an uninitialized memory condition or an incorrect MCD value of DCI 416.

Figure 4B:
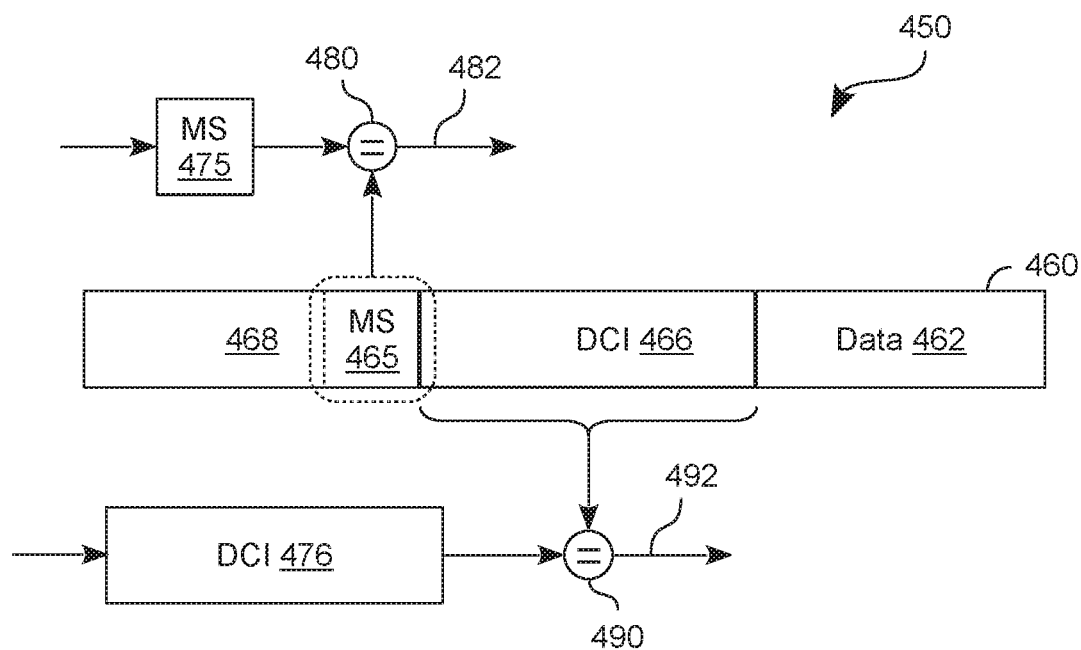

FIG. 4B shows features of processing 450 to evaluate memory state information according to another embodiment. Processing 450 is performed, for example, with one of systems 100, 300—e.g., where method 200 includes some or all of processing 450. In the example embodiment of processing 450, a memory access instruction from an application requests object data of a memory block (e.g., from one of contiguous memory blocks 328-336). The memory access instruction includes, or otherwise results in the use of, a pointer which references an address to the memory block.

A communication 460 in response to the memory access instruction comprises object data 462 and metadata for object data 462. Such metadata comprises a state identifier value MS 465 which indicates whether object data 462 is based on an uninitialized memory condition. The metadata further comprises a data color value DCI 466 (e.g., a MCD value) which is assigned to the memory block. In some embodiments, memory block 460 further includes additional metadata bits (such as the illustrative bits 468 shown). Similar to metadata 414, the metadata comprising MS 465 and DCI 466 is not necessarily accessed at the same memory block from which data 462 is retrieved.

In an embodiment, the pointer referencing the memory block which stores data 462 comprises (or is otherwise associated with) a fiducial data color value DCI 476 which is to be used as a basis for detecting whether DCI 466 indicates corruption of object data 462 and/or incorrect retrieval of the wrong object data. For example, processing of the memory access instruction comprises a comparison circuit 490 (e.g., of MDE 107) determining whether DCI 466 matches DCI 476. Where the comparison indicates a correct MCD value of DCI 466, comparison circuit 490 generates a signal 492 to enable execution of the memory access instruction. By contrast, signal 492 is to instead disable or otherwise prevent execution of the memory access instruction where, for example, the comparison indicates an incorrect MCD value of DCI 466.

In such an embodiment, processing the memory access instruction further comprises automatically performing an operation based on a state identifier MS 465 which is included in (or otherwise associated with) the memory block 460 which stores data 462. The operation is performed automatically by processor circuitry—e.g., independent of any software instruction which might explicitly specify that the operation is to be performed.

For example, execution of the memory access instruction includes or otherwise results in a comparison circuit 480 (e.g., of execution unit 104) evaluating whether MS 465 matches some predetermined fiducial value MS 475 indicating an uninitialized state—or alternatively, indicating an initialized state. Where the comparison indicates that data 462 is based on of an uninitialized memory condition, comparison circuit 480 generates a signal 482 that, for example, communicates a fault, stops execution of an instruction, or the like. By contrast, execution of the application is allowed to continue, where the comparison by comparison circuit 480 indicates that data 462 is independent of an uninitialized memory condition.

Figure 5:
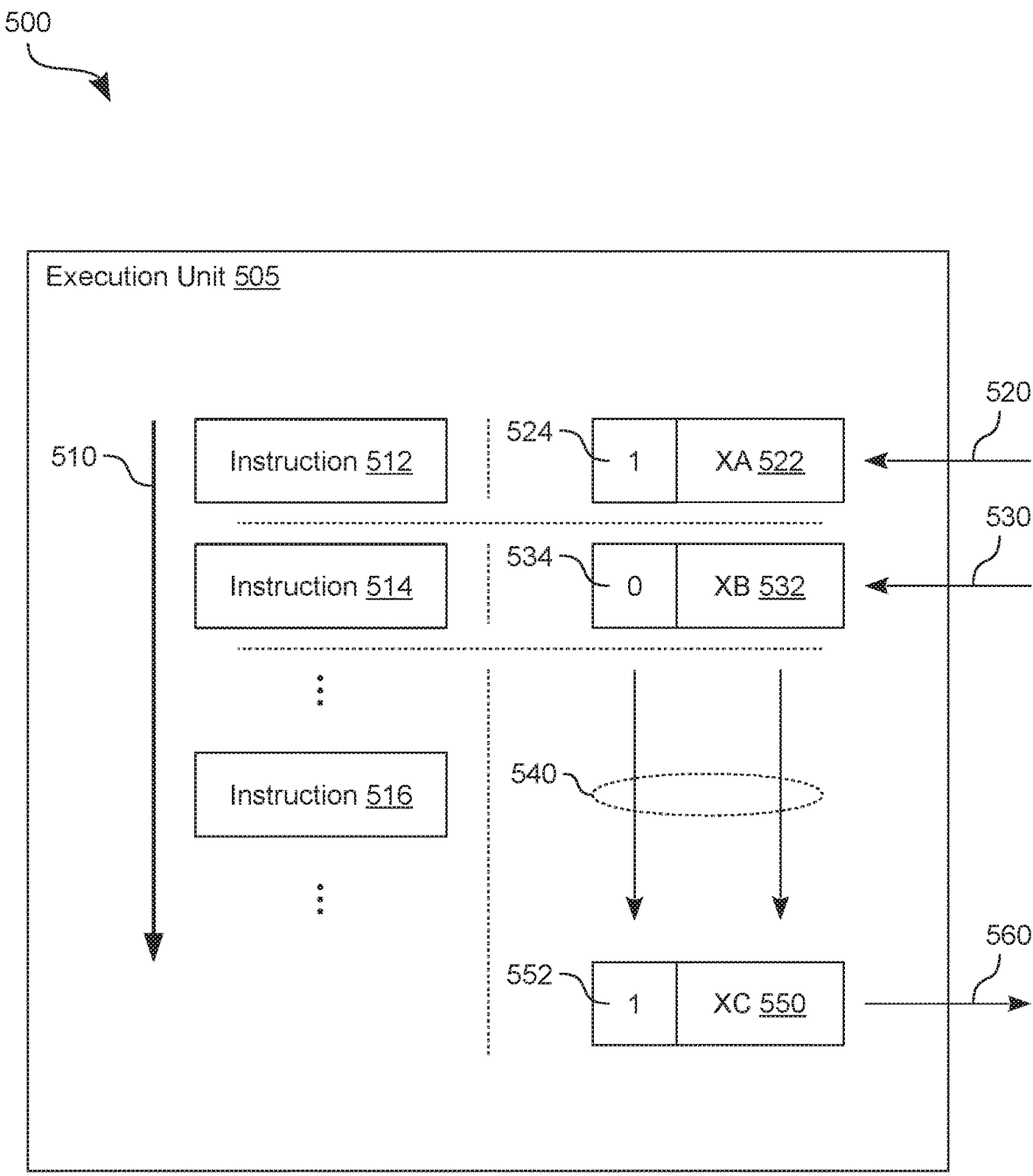
FIG. 5 is a hybrid diagram illustrating elements of processor logic to determine memory state information according to an embodiment.

FIG. 5 shows features of a processor 500, according to an embodiment, to process an instruction of a software application, where such processing automatically performs an operation based on metadata which specifies whether corresponding data (indicated by the instruction) is based on an uninitialized memory condition. In an embodiment, processor 500 provides functionality of one of systems 100, 300—e.g., wherein processor 500 is operable to perform method 200, processing 400 or processing 450.

As shown in FIG. 5, processor 500 includes an execution unit 505 (e.g., comprising features of execution unit 104) which is supports processing of an instruction sequence 510 of a software application. In the example embodiment shown, sequence 510 comprises instructions 512, 514, . . . , 516, some or all of which are to variously load, store, move, update or otherwise access data which is stored at (or is to be stored at) a memory resource such as addressable memory 112, memory 304, or the like.

By way of illustration and not limitation, processing of an instruction 512 results in a communication 520 of object data XA 522 and a corresponding state identifier 524—e.g., wherein state identifier 524 is automatically retrieved in association with a retrieval of XA 522 which is indicated by instruction 512. During communication 520, a value of state identifier 524 (e.g., Boolean "1") indicates that object data XA 522 is based at least in part on an uninitialized memory condition.

Sequence 510 may perform one or more subsequent operations based on the retrieved object data XA 522—e.g., wherein state identifier 524 determines at least in part the value of a state identifier for other data which the one or more subsequent operations determine based on XA 522. For example, processing of a subsequent instruction 514 similarly results in a communication 530 of other object data XB 532 and a corresponding state identifier 534—e.g., wherein, during communication 530, state identifier 534 indicates that object data XB 532 is independent of any uninitialized memory condition.

In one such embodiment, processing of a subsequent one or more instructions (e.g., including an instruction 516) results the performance 540 of one or more arithmetic, Boolean, and/or other operations which calculate object data XC 550 based on both XA 522 and XB 532. In addition, performance 540 includes or otherwise results in the automatic evaluation of a state identifier 552 corresponding to data XC 550.

In an embodiment, state identifier 552 indicates an uninitialized state—e.g., specifying that data XC 550 is based on an uninitialized memory condition—if XA 522 or XB 532 (or any other such data used to calculate XC 550) is based on an uninitialized memory condition. Alternatively, state identifier 552 would instead indicate an initialized state—e.g., specifying that data XC 550 is independent of an uninitialized memory condition—if all data used to calculate XC 550 is independent of an uninitialized memory condition. Subsequently the calculated object data XC 550 and corresponding state identifier 552 are sent in a communication 560 from execution unit 505—e.g., for storage to memory 110 or the like. Accordingly, an uninitialized memory state associated with a given memory block may be propagated to ("inherited by") some second memory block—even where, for example, that second memory block has previously been initialized.

FIG. 6A shows pseudocode 600-602 illustrating examples of operations that are variously performed each based on respective instruction processing according to a corresponding embodiment. Some or all of the operations variously indicated by pseudocode 600-602 are performed, for example, with execution unit 104, execution unit 505 or other such processing logic—e.g., according to method 200.

Pseudocode 600 is an example of a fault detection/handling software process which is invoked for a store instruction, the software process to explicitly perform an uninitialized memory read check and, in some embodiments, a MCD color check. Data identified by the store instruction corresponds to metadata which, for example, includes a five-bit MCD color value (memory_mcd_color[4:0]) and a one-bit state identifier (memory_mcd_color[5]). Processing the instruction includes the fault detection/handling process determining whether to execute the store (rather than asserting a fault, for example), where the determining is based on an evaluation of whether memory_mcd_color[4:0] indicates a MCD color value mismatch. Where no such mismatch is indicated, the process automatically sets the state identifier bit to indicate that the data is independent of any uninitialized memory condition.

Pseudocode 601 represents one or more operations which are implicitly performed based on the processing of an instruction to store data to some address (p) of a memory. Processing the store instruction includes—in addition to executing the indicated store operation—automatically storing a corresponding state identifier value to a table of metadata (such as metadata 116).

Pseudocode 602 represents one or more operations which are implicitly performed based on the processing of an instruction to load data from an address (p) of a memory to a register. Processing the load instruction includes determining whether to execute the indicated load operation (e.g., rather than generate a fault), where the determining is based on an evaluation of a state identifier corresponding to the data.

FIG. 6B shows pseudocode 610-614 illustrating examples of operations that are variously performed each based on respective instruction processing according to a corresponding embodiment. Some or all of the operations variously indicated by pseudocode 610-614 are performed, for example, with execution unit 104, execution unit 505 or other such processing logic—e.g., according to method 200. In pseudocode 610-614, parentheses are used to indicate operations which are executed "implicitly"—i.e., automatically in addition to any operation which is explicitly specified by a given instruction.

Pseudocode 610 illustrates one or more operations which are implicitly performed as part of (or otherwise based on) the processing of an instruction to load, to a register r1, data which is stored by a memory block at an address (p). In an embodiment, processing such an instruction includes—in addition to executing the specified data load—automatically loading a state identifier, corresponding to the data, from a table of metadata (such as metadata 116) to a bit r1' which, for example, is included in register r1.

Pseudocode 611 illustrates an operation which is implicitly performed based on the processing of an instruction to store data from a register r1 to a memory block at address (p). Processing such an instruction includes—in addition to executing the specified data store—automatically storing to a table of metadata (such as metadata 116) a state identifier which is at a bit r1' of register r1.

Pseudocode 612 illustrates an operation which is implicitly performed based on the processing of an instruction to move data from a register r2 to another register r1. Processing such a move instruction includes—in addition to executing the specified data move—automatically moving a corresponding state identifier value from a bit r2' of register r2 to a bit r1' of register r1.

Pseudocode 613 illustrates an operation which is implicitly performed based on the processing of an instruction to calculate a sum data based on a first value and a second value at registers r1, r2 (respectively). In one such embodiment, a first state identifier corresponding to the first value is at a bit r1' of register r1—e.g., where a second state identifier corresponding to the second value is at a bit r2' of register r2. Processing such an instruction includes (for example) executing a specified addition, resulting in a value at register r1 which is equal to a sum of the first value and the second value. Processing the instruction further includes automatically performing a Boolean operation based on the first state identifier and the second state identifier, resulting in a value at bit r1' which is equal to an OR of the first state identifier and the second state identifier.

Pseudocode 614 illustrates an operation which is implicitly performed based on the processing of an instruction to compare to one another a first value and a second value, at registers r1, r2 (respectively). In one such embodiment, a first state identifier corresponding to the first value is at a bit r1' of register r1—e.g., where a second state identifier corresponding to the second value is at a bit r2' of register r2. Processing such an instruction includes performing the specified comparison, where a fault conditionally generated if one of the first value or the second value is based on an uninitialized memory condition. The operations variously represented by pseudocode 610-614 are merely illustrative, and other embodiments provide more, fewer and/or alternative operations to support UMR detection functionality— e.g., wherein such functionality is to provide an automatic (e.g., implicitly executed) communication, modification, inheritance, evaluation and/or other such operation with an uninitialized state identifier.

The figures described herein detail exemplary architectures and systems to implement embodiments of the above. In some embodiments, one or more hardware components and/or instructions described herein are emulated as detailed below, or implemented as software modules.

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/ execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/ execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front-end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front-end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front-end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 8:
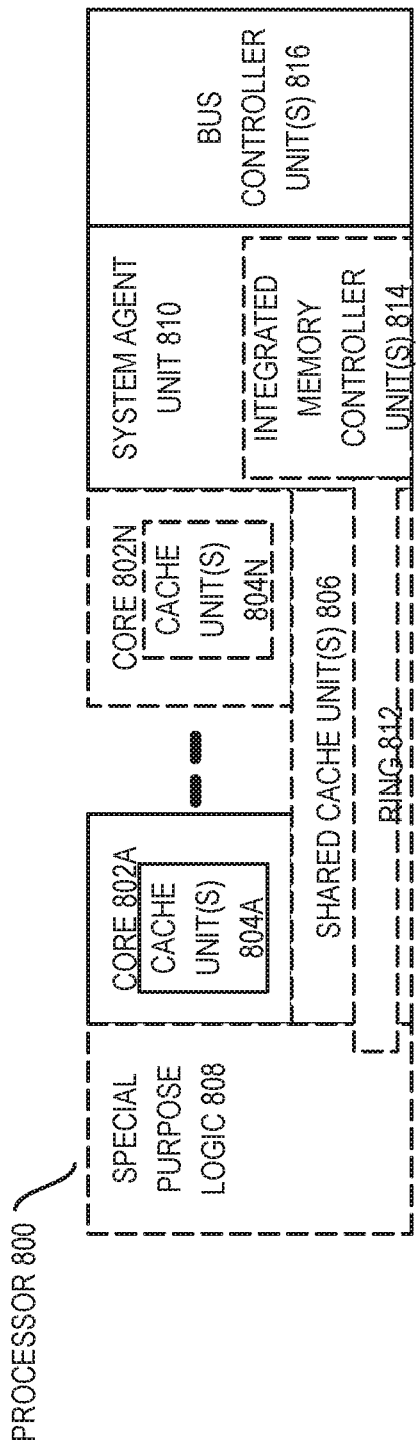
FIG. 8 is a block diagram of a processor that may have more than one core, may have an integrated memory controller, and may have integrated graphics according to embodiments of the invention.

FIG. 8 is a block diagram of a processor 800 that may have more than one core, may have an integrated memory controller, and may have integrated graphics according to embodiments of the invention. The solid lined boxes in FIG. 8 illustrate a processor 800 with a single core 802A, a system agent 810, a set of one or more bus controller units 816, while the optional addition of the dashed lined boxes illustrates an alternative processor 800 with multiple cores 802A-N, a set of one or more integrated memory controller unit(s) 814 in the system agent unit 810, and special purpose logic 808.

Thus, different implementations of the processor 800 may include: 1) a CPU with the special purpose logic 808 being integrated graphics and/or scientific (throughput) logic (which may include one or more cores), and the cores 802A-N being one or more general purpose cores (e.g., general purpose in-order cores, general purpose out-of-order cores, a combination of the two); 2) a coprocessor with the cores 802A-N being a large number of special purpose cores intended primarily for graphics and/or scientific (throughput); and 3) a coprocessor with the cores 802A-N being a large number of general purpose in-order cores. Thus, the processor 800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 800 may be a part of and/or may be implemented on one or more substrates using any of a number of process technologies, such as, for example, BiCMOS, CMOS, or NMOS.

The memory hierarchy includes one or more levels of cache within the cores (e.g., including cache units 804A-N), a set or one or more shared cache units 806, and external memory (not shown) coupled to the set of integrated memory controller units 814. The set of shared cache units 806 may include one or more mid-level caches, such as level 2 (L2), level 3 (L3), level 4 (L4), or other levels of cache, a last level cache (LLC), and/or combinations thereof. While in one embodiment a ring-based interconnect unit 812 interconnects the integrated graphics logic 808, the set of shared cache units 806, and the system agent unit 810/integrated memory controller unit(s) 814, alternative embodiments may use any number of well-known techniques for interconnecting such units. In one embodiment, coherency is maintained between one or more cache units 806 and cores 802A-N.

In some embodiments, one or more of the cores 802A-N are capable of multithreading. The system agent 810 includes those components coordinating and operating cores 802A-N. The system agent unit 810 may include for example a power control unit (PCU) and a display unit. The PCU may be or include logic and components needed for regulating the power state of the cores 802A-N and the integrated graphics logic 808. The display unit is for driving one or more externally connected displays.

The cores 802A-N may be homogenous or heterogeneous in terms of architecture instruction set; that is, two or more of the cores 802A-N may be capable of execution the same instruction set, while others may be capable of executing only a subset of that instruction set or a different instruction set.

Figure 9:
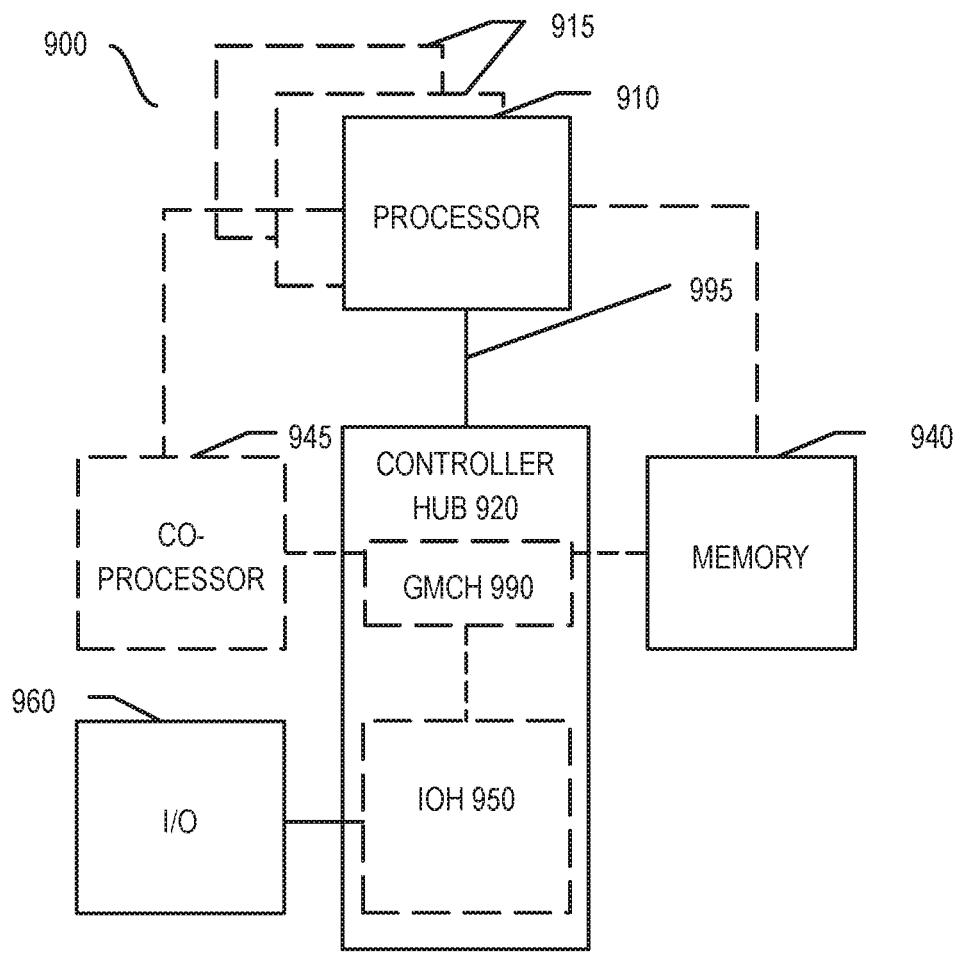
FIGS. 9 through 11 are block diagrams of exemplary computer architectures.
Figure 10:
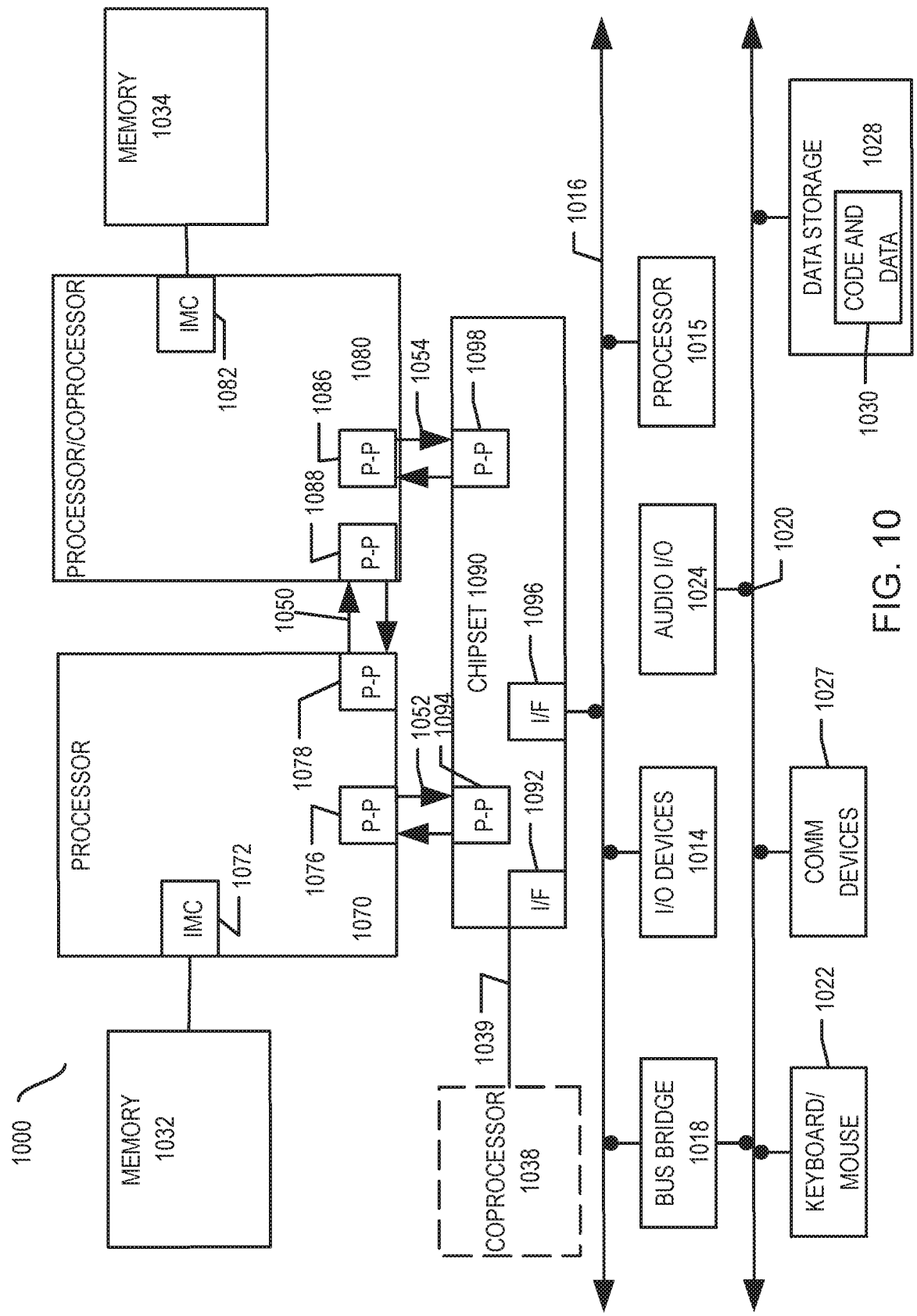
Figure 11:
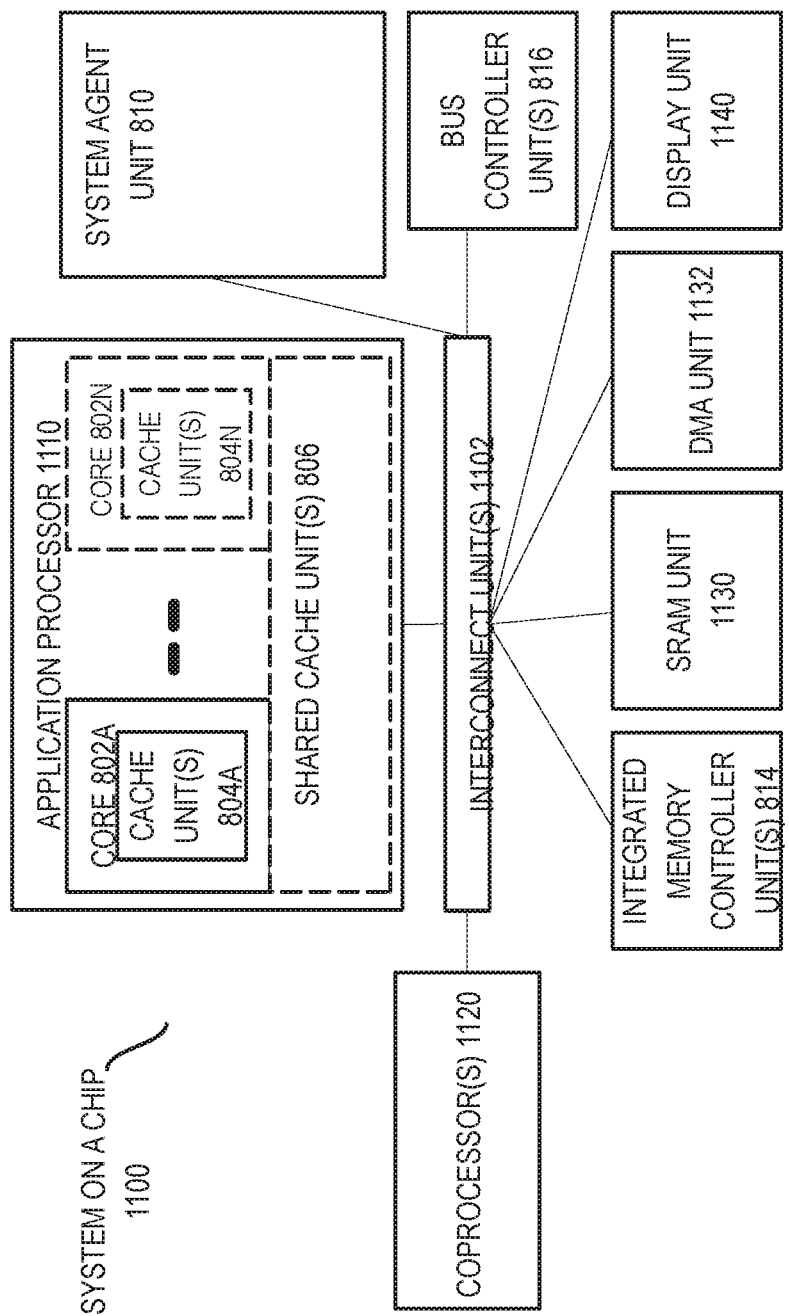

FIGS. 9-11 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 9, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950.

The optional nature of additional processors 915 is denoted in FIG. 9 with broken lines. Each processor 910, 915 may include one or more of the processing cores described herein and may be some version of the processor 800.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Referring now to FIG. 10, shown is a block diagram of a first more specific exemplary system 1000 in accordance with an embodiment of the present invention. As shown in FIG. 10, multiprocessor system 1000 is a point-to-point interconnect system, and includes a first processor 1070 and a second processor 1080 coupled via a point-to-point interconnect 1050. Each of processors 1070 and 1080 may be some version of the processor 800. In one embodiment of the invention, processors 1070 and 1080 are respectively processors 910 and 915, while coprocessor 1038 is coprocessor 945. In another embodiment, processors 1070 and 1080 are respectively processor 910 coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 10, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1092 and an interconnect 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 10, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and a storage unit 1028 such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 10, a system may implement a multi-drop bus or other such architecture.

Referring now to FIG. 11, shown is a block diagram of a SoC 1100 in accordance with an embodiment of the present invention. Similar elements in FIG. 8 bear like reference numerals. Also, dashed lined boxes are optional features on more advanced SoCs. In FIG. 11, an interconnect unit(s) 1102 is coupled to: an application processor 1110 which includes a set of one or more cores 202A-N and shared cache unit(s) 806; a system agent unit 810; a bus controller unit(s) 816; an integrated memory controller unit(s) 814; a set or one or more coprocessors 1120 which may include integrated graphics logic, an image processor, an audio processor, and a video processor; an static random access memory (SRAM) unit 1130; a direct memory access (DMA) unit 1132; and a display unit 1140 for coupling to one or more external displays. In one embodiment, the coprocessor(s) 1120 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 10, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products. Techniques and architectures for performing an in-memory computation are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor comprising:
    a decode unit to detect an instruction of an application, wherein the instruction specifies a first operation to be performed based on data, wherein metadata corresponding to the data comprises a state identifier which specifies whether the data is based on an instance of legacy data being allowed to persist in a memory block from before an allocation of the memory block to after the allocation; and
    an execution unit coupled to the decode unit, the execution unit to process the instruction, wherein the execution unit is to automatically perform a second operation, based on the state identifier, independent of any instruction of the application which specifies the second operation, wherein:
        any execution of the instruction is conditional upon an evaluation which is based on the state identifier; or
        the second operation is automatically performed based on an execution of the instruction;
    wherein a communication of both the data and the metadata, to or from a memory, is based on a pointer to a first memory block which is to store the data.

2. The processor of claim 1, further comprising:
    first circuitry, responsive to a first allocation of the first memory block, to set a value of the state identifier to specify that the data is based on an uninitialized memory condition.

3. The processor of claim 1, wherein the execution unit comprises:
    first circuitry to execute the instruction, wherein the state identifier comprises at least one state identifier bit, and wherein the metadata further comprises data color bits assigned to the data; and
    second circuitry, coupled to the first circuitry, to evaluate both the data color bits and the at least one state identifier bit.

4. The processor of claim 3, wherein the second circuitry is to compare a single metadata value to a corresponding fiducial value, wherein the single metadata value is to include both the data color bits and the at least one state identifier bit.

5. The processor of claim 3, wherein, in response to a detection by the second circuitry of both an initialized state and a correct data color value, the second circuitry is to signal the execution unit to perform an execution of the instruction.

6. The processor of claim 3, wherein, in response to a detection by the second circuitry of either an uninitialized state or an incorrect data color value, the second circuitry is to signal the third first circuitry to forego an execution of the instruction.

7. The processor of claim 1, wherein the execution unit comprises:
    first circuitry to execute the instruction, wherein the state identifier comprises at least one state identifier bit, and wherein the metadata further comprises data color bits assigned to the data; and
    second circuitry coupled to the first circuitry, wherein, of the data color bits and the at least one state identifier bit, the second circuitry is to evaluate only the data color bits, wherein, responsive to the second circuitry, the first circuitry is to perform an execution of the instruction.

8. The processor of claim 7, wherein the second circuitry is to compare a single metadata value to a corresponding fiducial value, the single metadata value including only the data color bits.

9. The processor of claim 7, wherein, in response to a detection by the second circuitry of a correct data color value, the second circuitry is to signal the first circuitry, to authorize an execution of the instruction by the first circuitry.

10. The processor of claim 9, wherein, responsive to the authorization, the first circuitry is to perform the execution conditional upon an evaluation of the at least one state identifier bit by the first circuitry.

11. The processor of claim 7, wherein, in response to a detection by the second circuitry of an incorrect data color value, the second circuitry is to signal the first circuitry to forego an execution of the instruction.

12. A method at a processor, the method comprising:
detecting an instruction of an application, wherein the instruction specifies a first operation to be performed based on data, wherein metadata corresponding to the data comprises a state identifier which specifies whether the data is based on an instance of legacy data being allowed to persist in a memory block from before an allocation of the memory block to after the allocation; and
processing the instruction, comprising automatically performing a second operation, based on the state identifier, independent of any instruction of the application which specifies the second operation, wherein:
any execution of the instruction is conditional upon an evaluation which is based on the state identifier; or
the second operation is automatically performed based on an execution of the instruction;
wherein a communication of both the data and the metadata, to or from a memory, is based on a pointer to a first memory block which is to store the data.

13. The method of claim 12, further comprising:
in response to a first allocation of the first memory block, setting a value of the state identifier to specify that the data is based on an uninitialized memory condition.

14. The method of claim 12, wherein processing the instruction comprises processing at execution circuitry of the processor, wherein the state identifier comprises at least one state identifier bit, and wherein the metadata further comprises data color bits assigned to the data, wherein evaluator circuitry, coupled to the execution circuitry, evaluates both the data color bits and the at least one state identifier bit.

15. The method of claim 12, wherein processing the instruction comprises processing at execution circuitry of the processor, wherein the state identifier comprises at least one state identifier bit, and wherein the metadata further comprises data color bits assigned to the data, wherein, of the data color bits and the at least one state identifier bit, evaluator circuitry coupled to the execution circuitry evaluates only the data color bits, wherein, responsive to the evaluator circuitry, the execution circuitry is to perform an execution of the instruction.

16. The method of claim 15, further comprising, in response to the evaluator circuitry detecting a correct data color value, the evaluator circuitry signaling the execution circuitry, to authorize an execution of the instruction by the execution circuitry.

17. The method of claim 15, further comprising, in response to the evaluator circuitry detecting an incorrect data color value, the evaluator circuitry signaling the execution circuitry to forego an execution of the instruction.

18. A system comprising:
a processor comprising:
a decode unit to detect an instruction of an application, wherein the instruction specifies a first operation to be performed based on data, wherein metadata corresponding to the data comprises a state identifier which specifies whether the data is based on an instance of legacy data being allowed to persist in a memory block from before an allocation of the memory block to after the allocation; and
an execution unit coupled to decode unit, the execution unit to process the instruction, wherein the execution unit is to automatically perform a second operation, based on the state identifier, independent of any instruction of the application which specifies the second operation, wherein:
any execution of the instruction is conditional upon an evaluation which is based on the state identifier; or
the second operation is automatically performed based on an execution of the instruction;
wherein a communication of both the data and the metadata, to or from a memory, is based on a pointer to a first memory block which is to store the data; and
a display device coupled to the processor, the display device to display an image based on the instruction.

19. The system of claim 18, the processor further comprising:
first circuitry, responsive to a first allocation of the first memory block, to set a value of the state identifier to specify that the data is based on an uninitialized memory condition.

20. The system of claim 18, wherein the execution unit comprises:
first circuitry to execute the instruction, wherein the state identifier comprises at least one state identifier bit, and wherein the metadata further comprises data color bits assigned to the data; and
second circuitry, coupled to the first circuitry, to evaluate both the data color bits and the at least one state identifier bit.

21. The system of claim 18, wherein the execution unit comprises:
first circuitry to execute the instruction, wherein the state identifier comprises at least one state identifier bit, and wherein the metadata further comprises data color bits assigned to the data; and
second circuitry coupled to the first circuitry, wherein, of the data color bits and the at least one state identifier bit, the second circuitry is to evaluate only the data color bits, wherein, responsive to the second circuitry, the first circuitry is to perform an execution of the instruction.

22. The system of claim 21, wherein, in response to a detection by the second circuitry of a correct data color value, the second circuitry is to signal the first circuitry, to authorize an execution of the instruction by the first circuitry.

* * * * *